United States Patent [19]

Burt

[11] Patent Number: 4,826,295
[45] Date of Patent: May 2, 1989

[54] CONTROLLED OPTICAL SIGNAL ABSORBER APPARATUS AND METHOD USING QUANTUM WELL LAYER STRUCTURE

[75] Inventor: Michael G. Burt, Woodbridge, England

[73] Assignee: British Telecommunications, London, England

[21] Appl. No.: 674,013

[22] Filed: Nov. 21, 1984

[30] Foreign Application Priority Data

Nov. 23, 1983 [GB] United Kingdom ............. 8331298

[51] Int. Cl.$^4$ .......................................... G02F 1/015
[52] U.S. Cl. ................................ 350/355; 350/386; 357/16; 370/4
[58] Field of Search ............................. 350/354–355, 350/386; 357/452, 16; 332/7.51; 370/1, 3, 4; 455/611

[56] References Cited

U.S. PATENT DOCUMENTS

| | | | |
|---|---|---|---|
| 3,748,597 | 7/1973 | Reinhart | 350/386 |
| 3,863,070 | 1/1975 | Wheeler et al. | 357/73.1 |
| 4,208,667 | 6/1980 | Chang et al. | 357/16 |
| 4,507,776 | 3/1985 | Smith | 370/4 |
| 4,525,687 | 6/1985 | Chemla et al. | 357/16 |

FOREIGN PATENT DOCUMENTS 1102749 2/1968 United Kingdom .
1331228 9/1973 United Kingdom .

OTHER PUBLICATIONS

Dingle et al., "Quantum States of Confined Carriers in Very Thin $Al_xGa_{1-x}As$–GaAs–$Al_xGa_{l-x}$ As Heterostructures", Phys. Rev. Letts., vol. 33, 9-1974, pp. 827–830.
Dingle et al., "Direct Observation of Superlatice Formation in a Semiconductor Heterostructure", Phys. Rev. Letts. vol 34, 5-1975, pp. 1327–1330.
Chang et al., "Resonant Tunneling in Semiconductor Double Barriers" App. Phys. Letts. vol. 24, 6-1974, pp. 593–595.
Chemla et al., Patent App. 470329, 2-28-83, Figs. 23–24.
Chang et al., "Controlled Emission in Heterojunction Structures", IBM Tech. Disc. Bull. 11-1977, pp. 2449–2450.
Chemla et al., Patent Application 470329, 2-28-83, pp. 1, 16, 18, 20, 25, 28–29, 33, 35, Figs. 38 and 42.
Levitt et al., "Improvement of Franz–Keldysh Light Modulator" IBM Tech. Disc. Bull., 7-1963, p. 83.
Olego et al., "Compositional Dependence of Band–Gap Energy & Conduction–Band Effective Mass of $Im_{l-x-y}Ga_xAl_y$ Latice Matched to INP", App. Phys. Letts., 9-1982, pp. 476–478.
Dyment et al., "Devices Based on Electroabsorption Effects in Reverse Biased GaAs–AlAs Double Heterostructures" Inst. Phys. Conf. Ser. No. #24, 1975.
Tomlinson, W. J. "Wavelength Multiplexing in Multimode Optical Fibers", App. Optics, 8-1977, pp. 2180–2194.
"Electroabsorption by Stark Effect on Room–Temperature Excitons in GaAs/GaAlAs Multiple Quantum Well Structures" by D. S. Chemla, T. C. Damen.
"Electric Field–Induced Quenching of Luminescence in Quantum Wells" by E. E. Mendez, G. Bastard, L. L. Chang and L. Esaki, *Physica*, vols. 117B and 118B, pp. 711–713 (1983), North–Holland Publishing Company.
"High Speed Optical Modulation with GaAs/GaAlAs Quantum Wells in a p–i–n Diode Structure" by T. H. Wood, C. A. Burrus, D. A. B. Miller, D. S. Chemla, T. C. Damen, A. C. Gossard, and W. Wiegmann, *Applied Physics Letters*, vol. 44, No. 1, pp. 16–18 (1984), New York, U.S.A.
"Heterojunctions and Semiconductor Superlattices", G. Allan, et al. ed., Proceedings of the Winter School Les Houches, France, Mar. 12–21, 1985, Springer-Verlag, Berlin, 1986.

*Primary Examiner*—John K. Corbin
*Assistant Examiner*—Martin Lerner
*Attorney, Agent, or Firm*—Nixon & Vanderhye

[57] ABSTRACT

An optical device having controllable absorption for an optical signal having a wavelength corresponding to a photon energy not exceeding 1.2 ev comprises (i) a semiconductor structure including one or more quantum well layers and (ii) means adapted for applying to the quantum well layers(s) an electric field such that the component of the field normal to the layer(s) may be controlled so as to determine the absorption edge of the quantum well layer(s) to be on either side of the optical signal wavelength. The device may be used as an optical modulator or switch and in optical demultiplexing.

21 Claims, 3 Drawing Sheets

FIG. 1
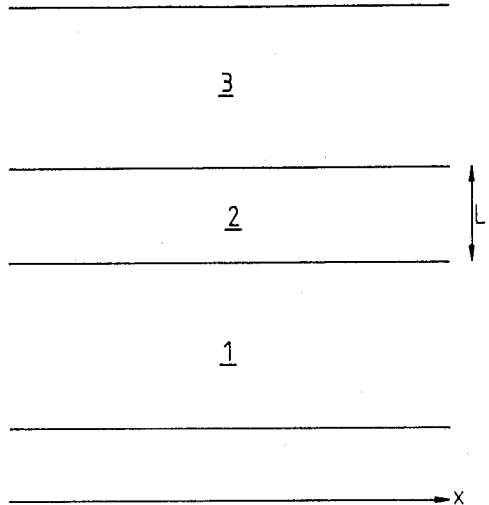
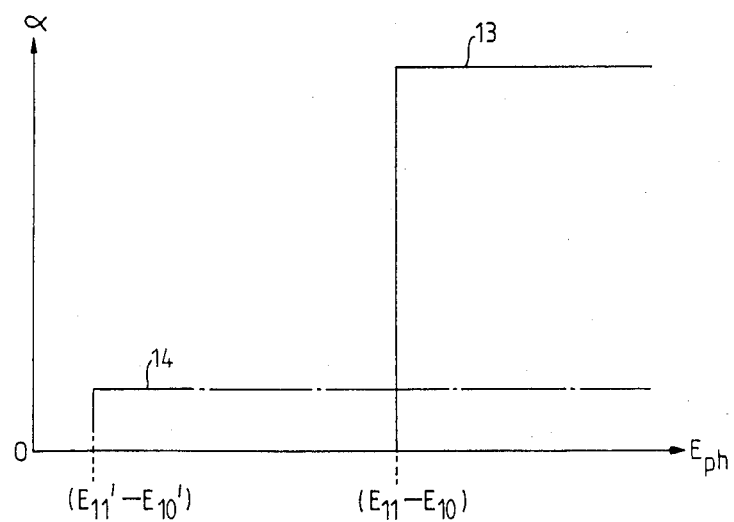
FIG. 4

FIG.5
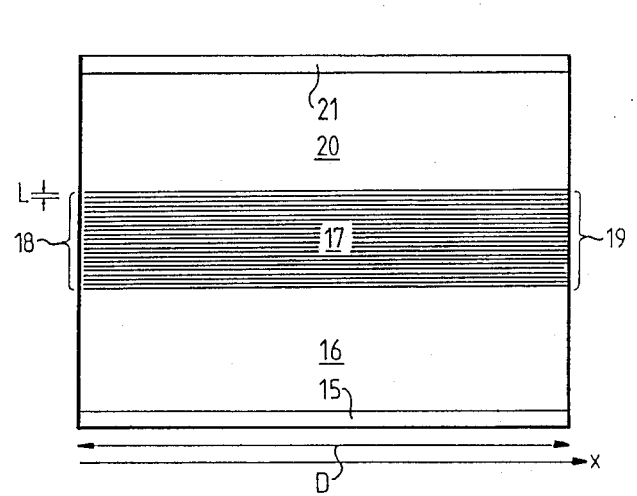
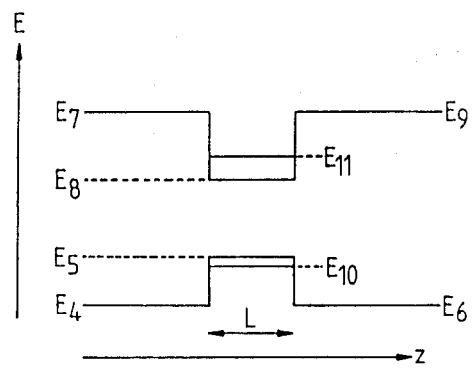
FIG.2
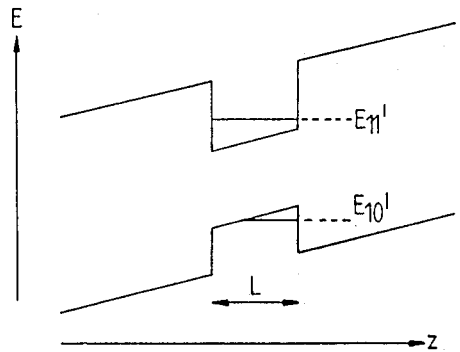
FIG.3

CONTROLLED OPTICAL SIGNAL ABSORBER APPARATUS AND METHOD USING QUANTUM WELL LAYER STRUCTURE

BACKGROUND OF THE INVENTION

The present invention relates to optical devices.

Devices have been proposed in which their absorptivity for incident radiation can be controlled by the potential applied to the device. In 1973, it was proposed in UK patent No. 1 331 228 that the Pockels effect (the linear change of refractive index of some materials with field strength) could be used for modulating a light source from a laser.

Silica optical fibres as produced in recent years for optical communications have absorption minima at 1.3 and 1.55 $\mu$m and therefore there is a need for devices capable of operating at such wavelengths. (The above wavelengths are in vacuo wavelengths as are all wavelengths herein except where otherwise specifically stated.)

D S Chemla, T C Damen, D A B Miller, A C Gossard, and W Wiegmann have reported, in Appl. Phys. Lett., 42(10), pages 864-866 (1983), that the absorption of photons at room temperature in a multi-quantum well structure comprising alternate GaAs and $Ga_{0.72}Al_{0.28}As$ layers is dependent on the electric field applied in the plane of the layers of the structure. This effect they ascribe principally to the shift of exciton resonances by the Stark effect. (An exciton is a hole in the valence band in combination with an electron in the conduction band.) They report marked dependence of absorptivity with applied potential at photon energies around 1.45 eV corresponding to a wavelength of about 0.85 $\mu$m (850 nm). They suggest that the effect could be used for high-speed optical modulators. One disadvantage of their proposal is that the application of a field in the plane of the layers can pose difficulties if such a device is to be integrated with others.

E E Mendez, G Bastard, L L Chang, L Esaki, H Morkoc, and R Fischer have reported, in Physica, 117B and 118B, pages 711-713 (1983), that the photoluminescence spectrum of a multi-quantum well structure at 6 K ($-267°$ C.) comprising alternate GaAs and $Ga_{1-x}Al_xAs$ layers is dependent on the electric field applied perpendicular to the layers of the structure. A complex variation is observed, both the relative height of two luminescence peaks and the positions of these peaks depending on the electric field. The authors interpret their results principally in terms of the Stark effect on excitons. The variation in question is at wavelengths around 0.75 $\mu$m (750 nm) corresponding to photon energies of about 1.65 eV. Mendez et al make no reference to possible practical applications of their results, and in any case the complexity of the variation and also the low temperatures used make such application unlikely.

SUMMARY OF THE INVENTION

The present invention is based at least inpart on our appreciation that useful changes in absorption of photons having energies not exceeding 1.2 eV (corresponding to wavelengths of at least 0.97 $\mu$m or 970 nm) can be achieved by the application of an electric field perpendicular to the layers of a quantum well structure. Without intending to limit the scope of the present invention in any way, we suggest that the higher refractive index of suitable materials in question and the lower effective mass of conduction band electrons and of valence band holes in these materials makes excitons less stable and therefore excitonic effects less significant. In our theoretical considerations of the present invention below we have accordingly chosen to ignore excitonic effects (in favor of quantum well effects).

The present invention provides a controllable optical absorption device for use with an optical signal having a wavelength corresponding to a photon energy not exceeding 1.2 eV, which comprises (i) a semiconductor structure including one or more quantum well layers and (ii) means adapted for applying to the quantum well layer(s) an electric field such that the component of the field normal to the layer(s) may be controlled so as to determine the absorption edge of the quantum well layer(s) to be on either side of the optical signal wavelength.

The present invention provides a method of modulating or switching an optical signal having a wavelength corresponding to a photon energy not exceeding 1.2 eV which comprises introducing the signal into one or more semiconductor quantum well layers and modulating the component of the electric field normal to the quantum well layer(s) so as to move the absorption edge of the quantum well layer(s) between positions to either side of the signal wavelength.

The immediately following discussion relates, for the sake of definiteness, to the device provided by the present invention, but it is to be understood that the features referred to relate equally to the method provided by the present invention.

Preferably the photon energy referred to above does not exceed 1.0 eV (corresponding to a wavelength of 1.24 $\mu$m or 1240 nm).

Preferably, a plurality of quantum well layers is used so as to increase effectiveness. At least five layers would normally be used, and more preferably at least twenty, usually between twenty and one hundred. The layers between quantum well layers will be referred to herein as interleaving layers.

Layers to either side of the qantum well or to either side of a plurality of alternating quantum well and interleaving layers (in a direction substantially perpendicular to the quantum well layers) will be referred to herein as cladding layers.

The thickness of the quantum well layers will depend on the materials used, but they will usually lie in the range from 20 Å (2 nm) to 200 Å (20 nm).

The means for applying the electric field preferably are suitable for varying the component of the field perpendicular to the quantum well layer(s) over a range of at least $10^3$ volt/cm, preferably of at least $10^4$ volt/cm. The upper limit on the electric field will depend on the breakdown voltage of the semiconducting materials used, which may be of the order of 2 or $3 \times 10^5$ volt/cm for III-V semiconductors. The means to apply the electric field conveniently comprises a pair of electrodes each spaced from the quantum well layer(s) by a cladding layer of semiconductor. A high resistance per unit area between the electrodes is required if high fields are to be achieved with low current flow. (High current flow causes heating and reduces operational stability.) This contrasts with quantum well lasers where relatively high current is indeed necessary. Conveniently, the quantum well layer(s) and also interleaving layers have dopant levels of less than $5 \times 10^{16}$ dopant atoms/cm$^3$, preferably of less than $5 \times 10^{15}$ dopant atoms/cm$^3$. In practice these low dopant levels will generally obtain into cladding layers for a depth of at least 0.2 μm, especially of at least 0.4 μm, and most especially of about 1.0 μm. A reverse-biased p-n junction may also be advantageously used in the design of the structure.

To achieve high extinction ratios (having regard to the non-sharpness of absorption edges in practice) the absorption edge should be moveable over a wavelength range corresponding to a range of photon energies of at least 5 meV, preferably at least 10 meV.

BRIEF DESCRIPTION OF THE DRAWINGS

The present invention will now be further described with reference to the accompanying Figures (all being schematic and not necessarily to scale), of which FIG. 1 shows in cross-section a single quantum well structure including a single quantum well in cross-section (hatching lines being omitted);

FIG. 2 shows the energy level diagram for a typical quantum well structure as shown in FIG. 1 in the absence of an applied field;

FIG. 3 shows the energy level diagram for a typical quantum well structure as shown in FIG. 1 in the presence of an applied field in the z direction;

FIG. 4 shows the theoretical absorption spectrum of a quantum well in the presence or absence of an applied field if excitonic effects are ignored;

FIG. 5 shows in section and by way of example only a device in accordance with the present invention (hatching lines being omitted);

DETAILED DESCRIPTION OF THE INVENTION

Figure 6:
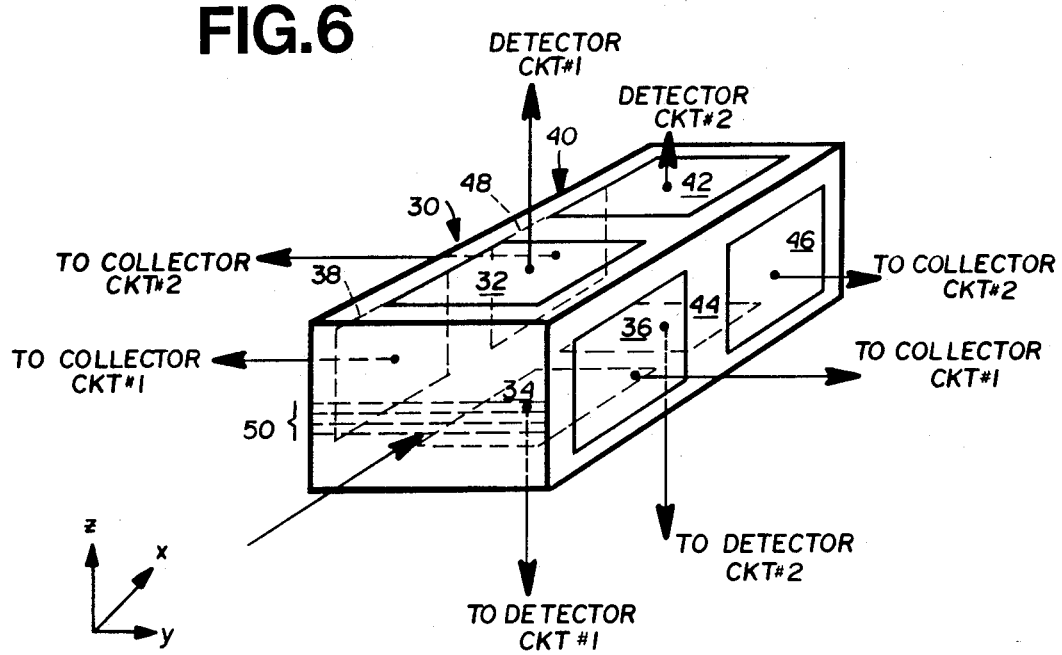
FIG. 6 shows an integrated composite quantum well structure.

In FIG. 1, 2 represents a layer of low band gap material of thickness L (the quantum well) and 1 and 3 represent layers of relatively high band gap material. As used in this specification and claims, the term "quantum well" shall mean a layer of relatively lower band gap disposed between layers of relatively higher band gap so that both the conduction and valence band edges of the quantum well layer are bracketed and encompassed within the conduction and valence band gap of the adacent layers thereby providing quantum well confinement of both electrons and holes within the quantum well layer.

In FIG. 2 (in which the direction z and thickness dimension L have the same significance as in FIG. 1), $E_4 E_5$, and $E_6$ represent the valence band edges of layers 1, 2, and 3 respectively while lines $E_7$, $E_8$, and $E_9$ represent the conduction band edges of layers 1, 2 and 3 in each case for bulk material. Because of the narrow width of the quantum well layer 2 the highest energy state in the valence band is $E_{10}$ and the lowest energy state in the conduction band is $E_{11}$. $(E_{11}-E_8) > (E_5-E_{10})$ because the effective mass of electrons in the conduction band is less than that of holes in the valence band.

In FIG. 3, showing the effect of an electric field, the energies of $E_{10}$ and $E_{11}$ of FIG. 2 (in the absence of an electric field) become $E_{10}'$ and $E_{11}'$ respectively, where $(E_{11}'-E_{10}') < (E_{11}-E_{10})$. The absorption edge of the quantum well is thereby shifted to lower energy (longer wavelengths). In addition the overlap between the conduction band states and valence band states is reduced because the field distorts the wavefunctions in opposite senses and the intensity of absorption is accordingly reduced. These effects are shown schematically in FIG. 4 comprising plots of absorption coefficient α against photon energy $E_{ph}$. 13 is the theoretical absorption spectrum in the absence of the field and 14 is the theoretical absorption spectrum in the presence of the field.

We can estimate quantitatively the effects in FIG. 4 in the case of a specific example. Let 2 be a layer of $Ga_x In_{1-x} As_y P_{1-y}$ lattice-matched to InP having a thickness L of 15 nm (150 Å), and let 1 and 3 be of InP, which has a band gap of about 1.4 eV. (Lattice-matching, of course, permits epitaxial growth.) For a suitable choice of x and y, $(E_{11}-E_{10})$ will be 0.95 eV corresponding to a wavelength of 1.3 μm. The effective masses of conduction band electrons and valence band holes in the $Ga_x In_{1-x} As_y P_{1-y}$ will be approximately 0.05 $m_e$ and 0.5 $m_e$ in such a case. For a field of $10^5$ volt/cm in the z direction, $E_{11}'$ is expected to be less by about 8 meV than $E_{11}$ and $E_{10}'$ is expected to exceed $E_{10}$ by about 32 meV. The absorption edge energy is accordingly reduced by about 40 meV corresponding to an increase in the wavelength of the absorption edge of about 0.057 μm. The absorption coefficient for the plateau to the high energy side of the absorption edge at $(E_{11}-E_{10})$ in the no-field case, for radiation passing through the quantum well layer in the x direction shown in FIG. 1 with its electric vector polarised in the y direction, is expected to be 4000 cm$^{-1}$ if one takes the well as infinitely deep. For the field of $10^5$ volt/cm in the z direction, the absorption coefficient is expected to be about 640 cm$^{-1}$ if one takes the quantum well as infinitely deep. Of course, the quantum well is in practice not infinitely deep and the effect on the absorption coefficient of non-confinement needs to be taken into consideration in considering practical devices (see the later discussion with respect to FIG. 5).

It must be remembered that FIG. 4 does show theoretical absorption spectra, and that in practice α is not zero below the absorption edges. From observations on bulk material we estimate that there will be on the low-energy side of the edge at $(E_{11}-E_{10})$ in the above example an absorption tail with $\alpha \lesssim 10$ cm$^{-1}$.

Rather similar effects to those in the above example could be achieved near 1.55 μm by the use instead for layer 2 of a $Ga_x In_{1-x} As_y P_{1-y}$ composition also lattice matched to the InP of layers 1 and 3 having a larger band gap. Another way of achieving such effects near 1.55 μm is to use $Ga_x In_{1-x} As$ of bulk band gap equivalent 1.67 μm and thickness about 100 Å as layer 2 lattice matched to the InP of layers 1 and 3.

In FIG. 5, depicting schematically a device in accordance with the present invention, 17 is a multi-quantum well structure comprising wells of thickness L similar to those described above with respect to FIGS. 1 to 4. For clarity, L is not shown to scale with the other dimensions, nor is the number of wells shown to be taken literally. The electric field is applied in the z direction by means of electrodes 15 and 21 and the light to be absorbed is directed onto end face 18 with its plane of polarisation in the y direction and the remnant after absorption in 17 emerges from end face 19. (Of course, one or both of the field and the direction of propagation could be reversed; the above senses are chosen only for the sake of definiteness.)

The multiple quantum well structure is constructed on the basis of the principles set out in the discussion of the single quantum well of FIGS. 1 to 4, except that in a multiple quantum well structure, the thickness of the high band gap materials corresponding to 1 and 3 in FIG. 1 and interleaving the well layers is subject to a compromise. If these interleaving layers are too thin, then the confinement of the wells will be inadequate (in the limiting case where the interleaving layers have zero thickness adjacent wells would merge); if on the other hand they are too thick, the field dependence of absorption for light passing between faces 18 and 19 will be low because of high proportion of high band gap material. For the materials discussed above suitable for operation at 1.3 μm or 1.55 μm, thicknesses of the order of 150 Å (15 nm) for the wells and of 100 Å (10 nm) for the interleaving layers of high band-gap material are generally suitable. A convenient number of wells is 30.

16 and 20 are cladding layers separating the multiple quantum well structure from the electrodes (which, if the electrodes are of metal, will be highly desirable in fabrication to avoid uncontrolled doping of the quantum well region). 16 and 20 may themselves comprise sub-layers, eg in consequence of fabrication convenience. The dopant levels in the layers or sub-layers between the electrodes are such that a change of the order of tens of volts in the potential applied between electrodes 15 and 21 changes the z component of the electric field in the quantum well structure 17 by about $10^5$ volt/cm. In the case of the quantum well layers, dopants in any case tend to make the quantum well effects less sharp.

16 and 20 have a higher band gap than the low band gap material of the quantum well structure and conveniently have the same band gap as the interleaving layers of the quantum well structure.

A point to be borne in mind in practical devices is that the zero-field case referred to in the discussion of FIGS. 1 to 4 above does not necessarily correspond to a zero potential applied between the electrodes 15 and 21. The device may have a built-in bias, eg as a result of junctions therein such as Schottky barriers.

Consider now the characteristics of a device as shown in FIG. 5. The values of α given above for spectra 13 and 14 in FIG. 4 are no longer appropriate for structure 17 in that one must take account of the distribution of the optical field over the quantum well layers and the interleaving layers. We estimate α above the absorption edge in the no-field case as about 2000 cm$^{-1}$ and that in the with-field case as about 300 cm$^{-1}$, for radiation passing between faces 18 and 19.

Consider in particular the device of FIG. 5 in respect of radiation having a photon energy between the no-field absorption edge $E_{11}-E_{10}$) in FIG. 4 and the with-field absorption edge ($E_{11}'-E_{10}'$) in FIG. 4. The absorption coefficient α for such radiation by the quantum wells can be expected to change from $\lesssim 10$ cm$^{-1}$ to 300 cm$^{-1}$ between the zero-field and the with-field case (for a field of $10^5$ volt/cm). A practical dimension for the absorption path (D in FIG. 5) is 200 μm. Over this path length within the quantum well material, if I is the radiation power intensity, $$\frac{dI}{dx} = -\alpha I,$$

from which it follows that the radiation power intensity emerging from face 19 will be $\lesssim 82$ percent of that incident on face 18 in the zero-field case and 0.24 percent of the incident in the field case, a change of $\gtrsim 25$dB.

It follows directly that the device of FIG. 5 is suitable for use as an amplitude modulator. For telecommunications purposes, light from a laser on continuous power can be introduced at 18 and can be amplitude shift keyed by switching between two values of the potential between electrodes 15 and 21. It would not be necessary for one of the potentials to correspond to zerofield, only that the absorption edge should be shifted from one side of the photon energy of the source to the other. There are circumstances where the use thus of an external modulator has advantages over the direct modulation of the source.

The device of FIG. 5 may also be used as an optical on-off switch for general use (rather than as a means of imparting message information to an optical signal).

The device can also be used as an adjustable filter for sources of large spectral width such as light emitting diodes.

The device may also be used as a detector of adjustable wavelength sensitivity if means are provided for sweeping out the carriers generated by the absorption of photons in the quantum well structure. Suitably, these means comprise collector electrodes (e.g. see FIG. 6) spaced apart in the y direction.

A series of two or more such detectors, each adjustable independently of the others, can be used for time or frequency demultiplexing. For time demultiplexing, various time-varying signals are applied to the respective devices so that the optical signal associated with each frame (i.e., the applied electric field on each of successive detectors varies as a function of time in synchronism with the respectively associated time frames of a time-multiplexed optical signal) is absorbed primarily in a respective device. For frequency demultiplexing, constant but different fields would be applied to successive devices, (i.e., the applied electric field on each of successive detectors is constant albeit different from that applied to the other detectors) the first device absorbing signals of one frequency, the second absorbing those of a lower frequency than the first, and so on.

Figure 7:
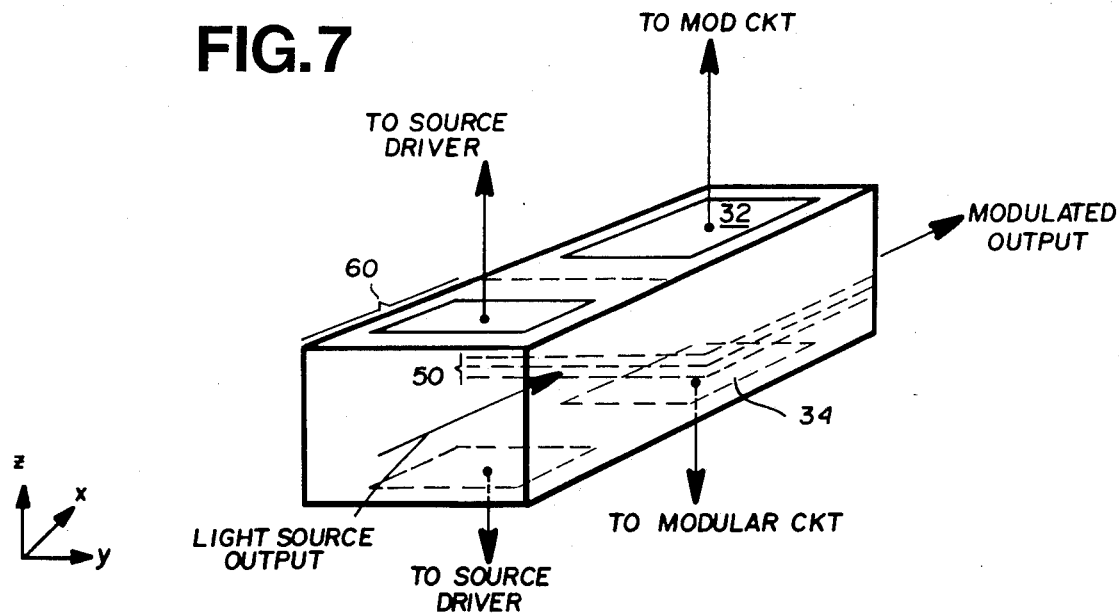
FIG. 7 shows an optical source integrated with a quantum well structure.

In the above, where combinations of devices or of a device with a laser are referred to, it is to be understood that integration may be convenient. Thus for example (see FIG. 6) two selective detectors 30, 40 may have continuous layers 50 corresponding to 16, 17, and 20 in FIG. 5, but separate electrodes 32-34, 42-44 corresponding to 15 and 21 and separate collector electrodes 92. A semiconductor optical source 60 also may be optically coupled to and/or integrated with the incident end of a quantum well modualtor/demodulator structure as depicted in FIG. 7.

I claim:

1. An optical device having controllable absorption for an optical signal having a wavelength corresponding to a photon energy not exceeding 1.2 eV, which comprises:

(i) a semiconductor structure including at least one quantum well layer;

(ii) means for applying to the quantum well layer an electric field having a component of the field normal to the layer which may be controlled so as to determine the absorption edge of the quantum well layer to be on either side of the optical signal wavelength; and optical signal input and output ports arranged to cause the propagation of the optical signal through the quantum well layer in a direction parallel to said layer.

2. An optical device accroding to claim 1, wherein the said component of the elctric field is controllable over a range of at least $10^3$ volt/cm.

3. An optical device according to claim 2, wherein the said component of the electric field is controllable over range of at least $10^4$ volt/cm.

4. An optical device according to any one of claims 1 to 3 having additionally means for sweeping out carriers generated by absorption in the quantum well layers.

5. An optical device according to any one of claims 1 to 3, wherein the said photon energy does not exceed 1.0 ev.

6. A combined optical source and modulator comprising (a) a source adapted to produce light having a source wavelength corresponding to a photon energy not exceeding 1.2 eV and (b) a device according to claim 1 having variable absorption for the source wavelength, the source and the device being optically coupled.

7. A combined optical source and modulator according to claim 6, wherein the source wavelength corresponds to a photon energy not exceeding 1.0 eV.

8. A combined optical source and modulator according to claim 6, wherein the source is a semiconductor laser.

9. A combined optical source and modulator according to claim 6 wherein the source is a semiconductor source and is integrated with the device.

10. An optical demultiplexer comprising two or more devices each according to claim 1 with optical connection between the quantum well layer of sequential devices.

11. An integrated optical demultiplexer according to claim 10.

12. A method of modulating or switching an optical signal having a wavelength corresponding to a photon energy not exceeding 1.2 eV which comprises:
introducing the optical signal into at least one semiconductor quantum well layer so as to propagate in the plane of said layer and modulating a component of an electric field disposed normal to the quantum well layer so as to move the absorption edge of the quantum well layer between positions to either side of the signal wavelength.

13. A method according to claim 12, wherein the said component of the electric field is varied over a range of at least $10^3$ volt/cm.

14. A method according to claim 13, wherein the said component of the electric field is varied over a range of at least $10^4$ volt/cm.

15. A method according to any one of claims 12 to 14 wherein the said photon energy does not exceed 1.0 eV.

16. A method of time demultiplexing an optical signal corresponding to a photon energy not exceeding 1.2eV which comprises applying respectively different time-varying electric fields to successive multiple quantum well layer devices, each having semiconductor quantum well layer with a low conductance-valence energy band gap located between interleaved layers having a substantially higher conductance-valence energy band gap encompassing and bracketing said low energy band gap so as to provide quantum well confinement of both electrons and holes in each quantum well layer, said devices being optically coupled for passage of an optical signal propagating within said multiple quantum well layers and parallel to the plane of said quantum well layers while said electric field are oriented perpendicular to said quantum well layers so as to move the absorption edge of the quantum well layers between positions to either side fo the signal wavelength.

17. A method of frequency demultiplexing an optical signal corresponding to photon energy not exceeding 1.2eV which comprises applying respectively different but constant electric fields to the multiple quantum well layers of successive quantum well layer devices, each having semiconductor quantum well layers with a low conductance-valence energy band gap located between interleaved layers having a substantially higher conductance-valance energy band gap encompassing and bracketing said low energy band gap so as to provide quantum well confinement of both electrons and holes in each quantum well layer, said devices being optically coupled for passage of an optical signal propagating within said multiple quantum well layers while said electric fields are oriented perpendicular to said quantum well layers.

18. An optical device having controllable absorption for an optical signal having a wavelength corresponding to a photon energy not exceeding 1.2 eV and not based upon use of the Stark effect on excitons, which device comprises:
   (i) a semiconductor structure including multiple quantum well layers;
   (ii) means for applying to the quantum well layers an electric field having a component of the field normal to the layers which may be controlled so as to determine the absorption edge of the quantum well layers to be on either side of the optical signal wavelength for optical signals propagating through the quantum well layers in a direction parallel to said layers, said optical signal having an electric vector disposed parallel to said layers; and
   (iii) optical signal input and output ports arranged to cause the propagation of the optical signal, having an electric vector disposed parallel to the layers, through the quantum well layers in a direction parallel to said layers.

19. A method of modulating or switching an optical signal having a wavelength corresponding to a photon energy not exceeding 1.2 eV without substantially using the Stark effect on excitons, which method comprises the step of:
introducing an optical signal into multiple semiconductor quantum well layers so as to propagate in the plane of said layer and modulating a component of an electric field disposed normal to the quantum well layers so as to move the absorption edge of the quantum well layers between positions to either side of the signal wavelength for optical signals propagating through the quantum well layers, said optical signal having an electric vector disposed parallel to said layers.

20. A method of time demultiplexing an optical signal corresponding to a photon energy not exceeding 1.2eV by propagating within multiple quantum well layers along an x-axis parallel to said layers, an optical signal having an electric vector oriented along a y-axis perpendicular to said x-axis but yet parallel to said layers, and applying respectively different time-varying electric fields to successive quantum well layer devices, each having semiconductor quantum well layers with a low conductance-valence energy band gap located between interleaved layers having a substantially higher conductance-valence energy band gap encompassing and bracketing said low energy band gap so as to provide quantum well confinement of both electrons and holes in each quantum well layer, said devices being optically coupled for passage of an optical signal propagating within said multiple quantum well layers and parallel to the plane of said quantum well layers while said electric fields are oriented along a z-axis perpendicular to said quantum well layers and perpendicular to both said x and y axes so as to move the absorption edge of the quantum well layers between positions to either side of the signal wavelength.

21. A method of frequency demultiplexing an optical signal corresponding to a photon energy not exceeding 1.2eV by propagating within multiple quantum well layer along an x-axis parallel to said layers, an optical signal having an electric vector oriented along a y-axis perpendicular to said x-axis but yet parallel to said layers, and applying respectively different but constant electric fields to the quantum well layers of successive quantum well layer devices, each having semiconductor quantum well layers with a low conductance-valaence energy band gap located between interleaved layers having a substantially higher conductance-valence energy band gap encompassing and bracketing said low energy band gap so as to provide quantum well confinement of both electrons and holes in each quantum well layer, said devices being optically coupled for passage of an optical signal in the plane of said quantum well layers while said electric fields are oriented perpendicular to said quantum well layers and perpendicular to both x and y axis.

* * * * *

UNITED STATES PATENT AND TRADEMARK OFFICE
CERTIFICATE OF CORRECTION

PATENT NO. : 4,826,295

DATED : 2 May 1989

INVENTOR(S) : BURT

It is certified that error appears in the above-identified patent and that said Letters Patent is hereby corrected as shown below:

Cover page, item [73], change "British Telecommunications" to --British Telecommunications public limited company--;

item [5b], column 2, line 7, change "INP" to --InP--;
      line 10, change "GaAs-AlAs" to --GaAs-GaAlAs--;
      line 17, after "Damen", insert --, D.A.B. Miller, A.C. Gossard and W. Wiegmann, Applied Physics Letters, Volume 42, No. 10, 1983, N.Y., USA.--

In the specification and claims:
Column 2, line 50, change "fie1d" to --field--.
Column 3, line 53, change "$E_4E_5$" to --$E_4$, $E_5$--.
Column 5, line 68, change "3/825dB" to --$\gtrsim$ 25dB--.
Column 7, line 1, change "accroding" to --according--;
      line 31, change "layer" to --layer)s)--;
      line 41, change "eIectric" to --electric--;
      line 58, change "layer" to --layers--; and
      line 67, change "field" to --fields--.
Column 8, line 2, change "fo" to --of--;
      line 11, change "valance" to --valence--; and
      line 47, change "layer" to --layers--.

UNITED STATES PATENT AND TRADEMARK OFFICE
CERTIFICATE OF CORRECTION

PATENT NO. : 4,826,295

DATED : May 2, 1989

INVENTOR(S) : BURT

It is certified that error appears in the above-identified patent and that said Letters Patent is hereby corrected as shown below:

Column 9, line 13, change "layer" to --layers--.

Signed and Sealed this

Nineteenth Day of June, 1990

Attest:

HARRY F. MANBECK, JR.

Attesting Officer     Commissioner of Patents and Trademarks